United States Patent [19]

Hunt

[11] Patent Number: 5,505,544
[45] Date of Patent: Apr. 9, 1996

[54] CHAMBER TEMPERATURE UNIFORMITY TEST FIXTURE

[75] Inventor: Thomas J. Hunt, Peekskill, N.Y.

[73] Assignees: Sony Corp., Tokyo, Japan; Materials Research Corp., Orangeburg, N.Y.

[21] Appl. No.: 214,367

[22] Filed: Mar. 17, 1994

[51] Int. Cl.[6] .............................. G01K 7/04; G01K 3/06; G01K 1/14
[52] U.S. Cl. .......................... 374/166; 374/137; 374/141; 374/208; 392/416; 392/418; 219/391; 437/8; 118/712; 118/724; 118/641
[58] Field of Search ..................................... 374/166, 137, 374/141, 179, 208; 219/391; 392/416, 418; 437/8; 118/712, 724, 641

[56] References Cited

U.S. PATENT DOCUMENTS

| | | | |
|---|---|---|---|
| 3,263,502 | 8/1966 | Springfield | 374/179 |
| 3,280,312 | 10/1966 | Sandelien | 374/153 |
| 4,176,554 | 12/1979 | Kazmierowicz | 374/137 |
| 4,242,907 | 6/1981 | Kazmierowicz . | |
| 5,049,486 | 9/1991 | Blackwood et al. | 374/141 |
| 5,108,192 | 4/1992 | Mailliet et al. | 374/166 |
| 5,192,132 | 3/1993 | Pelensky | 374/166 |
| 5,228,114 | 7/1993 | Suzuki | 374/166 |
| 5,232,517 | 8/1993 | Hilborn et al. | 374/179 |

FOREIGN PATENT DOCUMENTS

| | | | |
|---|---|---|---|
| 0667810 | 7/1963 | Canada | 374/141 |
| 00446083 | 9/1991 | European Pat. Off. | 374/179 |
| 3119496 | 12/1982 | Germany . | |
| 0151532 | 9/1983 | Japan | 374/137 |
| 405152231 | 6/1993 | Japan | 374/137 |
| 7809960 | 4/1980 | Netherlands | 374/166 |
| 1195110 | 6/1970 | United Kingdom | 374/141 |

OTHER PUBLICATIONS

Pei–Zhong Xu et al., "Experimental study of substrate temperature" Applied Optics, vol. 28, No. 14, Jul. 15, 1989.
Abstract, Japanese Patent Application 57–73639, Published May 8, 1982, "Temperature Measurement System" Patent Abstacts of Japan, vol. 6, No. 156, Aug. 17, 1982.

*Primary Examiner*—Diego F. F. Gutierrez
*Attorney, Agent, or Firm*—Wood, Herron & Evans

[57] ABSTRACT

A fixture for measuring the temperature of a chamber at a number of locations includes a body sized for placement within the chamber, and a number of temperature probes mounted on the body in orientations such that, when the body is placed within the chamber, the probes measure the temperature of the chamber at desired locations. The body also includes adjustable guides which engage the walls of the chamber to assist in positioning the body.

30 Claims, 2 Drawing Sheets

CHAMBER TEMPERATURE UNIFORMITY TEST FIXTURE

FIELD OF THE INVENTION

The present invention relates to thermal treatment chambers and inspecting the temperature uniformity of such chambers.

BACKGROUND OF THE INVENTION

Thermal treatment chambers are used to process various materials to change their physical properties, usually by heating the material to temperatures up to several hundred degrees Celsius. Typically, batches of several production units are loaded into the chamber and subjected to chamber temperatures for a fixed period of time.

Often it is desirable to test the temperature uniformity within a chamber, e.g. to ensure that the different production units in the same heating batch are receiving the desired heat treatment, or alternatively where only one production unit is treated at a time, to ensure the unit is exposed to a uniform temperature profile. One way this has been done is by placing a number of thermocouples at various locations within the chamber, and then monitoring the temperatures at these locations via electrical signals from the thermocouples.

One difficulty with this technique is that it can be difficult and dangerous to place the thermocouples when the chamber is at its operating temperature, particularly where the operating temperature is several hundred degrees Celsius. Furthermore, it takes at least a few minutes to place the thermocouples with sufficient accuracy to make repeatable and useful measurements, but a technician placing thermocouples in, for example, the searing heat used for heat treating, is unlikely to have sufficient time to make accurate placements.

Thus, greater accuracy and safety can be achieved by placing the thermocouples while the chamber is at room temperature. However, doing so can add significantly to downtime, because chambers often take hours to achieve operating temperature.

One possible solution is to temporarily attach the thermocouples to one of the production units being treated, before inserting the production unit in the chamber (or perhaps to permanently attach thermocouples to a "dummy" production unit). This technique increases safety and reduces downtime because the thermocouples can be inserted into the chamber as part of the normal production routine. However, because the thermocouples are attached to the production material, they often are not placed at the ideal locations for measurements and also are subject to placement inaccuracy. Furthermore, because the thermocouples are mounted on production material which typically has a large heat capacity, the readings obtained from the thermocouples are influenced by the production material and therefore are relatively less responsive to chamber temperature variations than thermocouples which are placed separately.

Optical pyrometers are in some cases used to perform localized temperature measurements in a thermal treatment chamber. The pyrometer is mounted at the end of a probe which is manually aimed at the desired location within the chamber. This technique has the disadvantage that the pyrometer is difficult to position accurately and consistently, and the chamber door must remain at least partially open to permit manual manipulation of the probe, potentially causing inaccurate readings.

SUMMARY OF THE INVENTION

In accordance with principles of the present invention, temperature probes such as thermocouples are attached to a fixture which can be quickly placed in a predetermined position within a thermal treatment chamber. Because the probes are attached to the fixture, they are accurately and repeatably located at desired locations inside the chamber. The fixture may be placed in the chamber between production batches, or accompanied by a batch of production units. The fixture has a low total heat capacity (substantially lower than the production units themselves); therefore, the probes on the fixture are sensitive to heat variations in the chamber and effectively identify temperature non-uniformities. Furthermore, because the heat capacity of the fixture is low, relatively little time is required to obtain a measurement, thus reducing the downtime of the chamber and/or reducing damage done to production units which are in the chamber with the fixture when a malfunction is detected.

In preferred embodiments, the fixture includes one or more guides which engage the chamber to guide the fixture into the predetermined location. These guides are adjustable, so that the fixture can be used on different chambers. The guides may engage the chamber in one, two, or three dimensions, depending on the chamber and the specific embodiment. The guides may be fashioned as two telescoping rods using a retention pin, or as two threaded members. The fixture may also have a removable handle to speed placement and removal.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
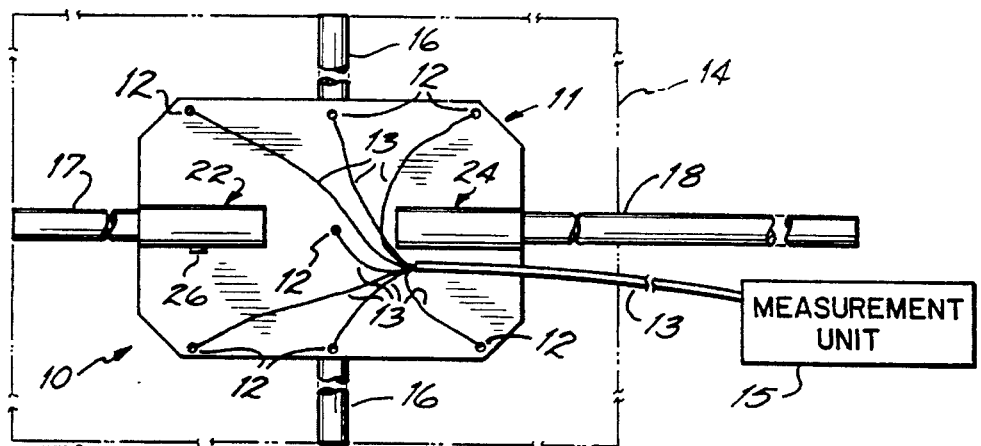
FIG. 1 is a top view of a fixture placed in a chamber in accordance with principles of the invention.

Referring to FIG. 1, a chamber temperature monitoring fixture 10 in accordance with the present invention includes a body 11 which supports a number of thermocouples 12 at various fixed positions on the body 11. As shown in FIG. 1, in one embodiment six thermocouples 12 are mounted at the outer edges and sides of body 11, and a seventh thermocouple 12 is mounted at the center of body 11. Wires 13 leading from the thermocouples are gathered on the fixture 10 and lead to a measurement unit 15 outside of the chamber 14.

For operating temperatures in the range of 200–1400 degrees Celsius, "K-type" thermocouples, which utilize a chromel-alumel junction, are suitable. Other temperature ranges can be measured with other thermocouple types. K-type thermocouples may be calibrated against a reference thermocouple to an accuracy of approximately ±3 degrees Celsius, permitting measurements of chamber temperature within the same tolerance. Suitable thermocouples (including reference thermocouples) can be obtained from Omega Engineering, Inc., 1 Omega Drive, P.O. Box 4047, Stamford, Conn. 06907.

Figure 1A:
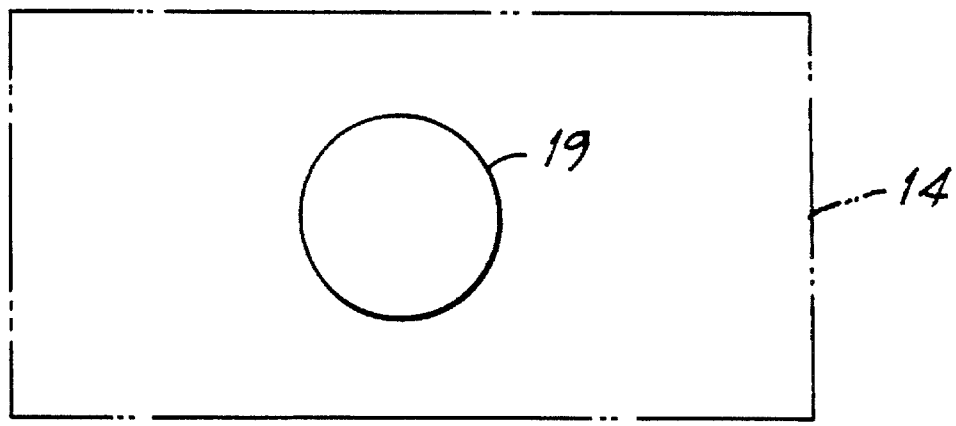
FIG. 1A is a top view of a batch of production units placed in the chamber.

Body 11 is sized to fit within the chambers to be tested, and may be manufactured of any heat resistant substance. For example, one use of a chamber is to heat treat disc-shaped titanium sputter deposition targets used in semiconductor processing. Typical targets have thicknesses of 0.625 inches, have diameters of 10 or 12 inches and weigh 8 or 11 pounds, respectively. Referring to FIGS. 1A and 2A, during heat treating, typically a stack of, e.g., five targets 19 is placed inside a chamber 14 having internal dimensions of, e.g., 20 inches width by 14 inches height by 48 inches depth. The targets are heated to a temperature of up to 1200 degrees Celsius. To minimize significant mechanical flaws, this temperature should be maintained to an accuracy of ±10 degrees Celsius, which is easily achievable using calibrated K-type thermocouples.

For this environment, fixture 10 can be manufactured of a Titanium plate 11 which is 0.375 inches thick, cut in a 12 inch by 8 inch rectangular shape, with the corners removed at 45 degree angles for safety. A fixture of this size will weigh approximately 4 to 5 pounds, and thus will have a heat capacity of approximately half that of the targets.

Referring again to FIG. 1, mounted on body 11 are a number of elongated appendages, for example in the form of cylindrical tubes. Appendages 16 extend from the sides of body 11 and aid the operator in positioning the fixture 10 from side to side within a chamber 14. Appendage 17 extends from an end of the body and aids the operator in positioning the fixture 10 at the appropriate distance from the rear of the chamber 14. The appendages 16, 17 are sized to engage the side and rear walls of the chamber and thereby guide the fixture in two dimensions to a desired location inside of the chamber 14. Handle 18, which extends from the outward end of the fixture 10 opposite appendage 17, is used by the operator to position the fixture within the chamber 14.

Figure 2:
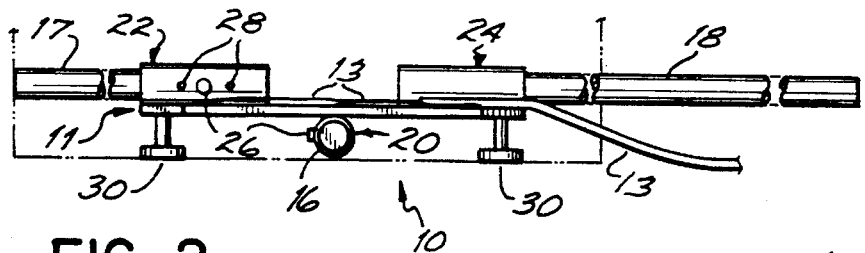
FIG. 2 is a side view of the fixture and chamber shown in FIG. 1 taken along lines 2—2.
Figure 2A:
FIG. 2A is a side view of the batch and chamber of FIG. 1A.

Referring to FIG. 2, which is a side view of the fixture 10 and chamber 14, each of appendages 16 and 17, and handle 18, are mounted to body 11 by insertion of the appendage into mounts 20, 22 and 24, respectively. Mounts 20, 22 and 24 are larger cylindrical tubes mounted to body 11. These tubes are sized to form a telescoping connection with appendages 16, 17 and handle 18.

The tubes forming the appendages and the mounts may be manufactured of any heat resistant substance, for example of Titanium tubing having a 0.5 inch inner diameter for the mounts and 0.5 inch outer diameter for the appendages.

Also shown in FIG. 2 are standoffs 30, which are mounted to body 11 at each of the four corners of body 11 and support the lower surface of body 11 a predetermined distance, e.g., 0.5 inches, above the floor of the chamber 14. Standoffs should be sized to keep body 11 at least a half-inch away from the interior floor of the chamber 14, and in approximately the same position as a production unit during thermal treatment. Standoffs 30 have threaded upper ends, and are mounted into tapped holes in the underside of body 11. Standoffs 30 may be manufactured of any heat resistant substance, for example stainless steel. To permit adjustment of the height of body 11 within the chamber 14, multiple sets of standoffs 30 having differing lengths can be manufactured. If differing chambers treat production units at substantially different heights, for each chamber the appropriate corresponding set of standoffs is screwed into body 11. Thus, the standoffs provide a guide for positioning the fixture inside the chamber in a third, vertical dimension.

Figure 3:
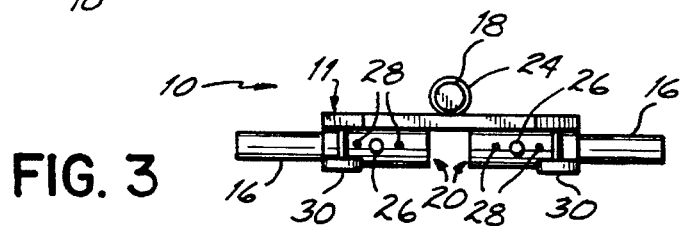
FIG. 3 is an end view of the fixture shown in FIG. 1 taken along lines 3—3.
Figure 4A:
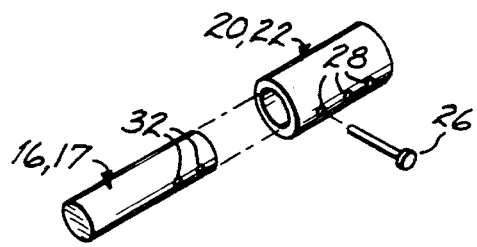
FIG. 4A is a perspective view of the locking pin adjustment used in the fixture of FIGS. 1–3.

Referring now to FIG. 2 and FIG. 3 (which is an end view of the fixture 10), and FIG. 4A (which is a perspective view of an appendage and mount of the fixture 10), the appendages are retained within their respective mounts by retaining pins 26. Each appendage has one or more holes 32 drilled therethrough; these holes mate with one or more holes 28 drilled through the corresponding mount. To retain the appendage at a desired location within the mount, the holes on the appendage and mount are aligned at the desired location, and a pin 26 is inserted through the aligned holes, thereby retaining the appendage and mount in the desired location.

By removing the pin and realigning different holes on the appendage and mount, a different desired location can be selected. Thus, for chambers having differing sizes, the appendages may be adjusted appropriately for each chamber to allow the fixture to fit inside the chamber, and to ensure that body 11 is positioned at the same location (e.g., the approximate location of the production units during thermal treatment). Alternatively, if a substantially different appendage length is needed for two chambers, a second, different appendage having the desired length may be manufactured; one appendage may be removed and replaced with another when using the fixture 10 with different chambers.

Figure 4B:
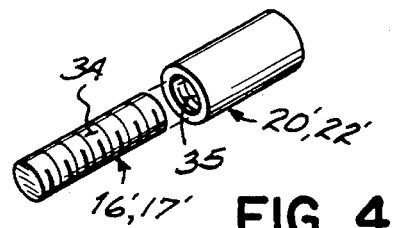
FIG. 4B is a perspective view of an alternative adjustment for the fixture of FIGS. 1–3.

Referring to FIG. 4B, in an alternative embodiment, the appendages 16', 17' and mounts 20', 22' are manufactured with mating threads 34, 35, so that each appendage may be screwed into and out of a mount to adjust the length of the appendage projecting from the fixture 10.

In either of the above embodiments, either or both of an appendage and its corresponding mount may be scribed with numbers or other marks which serve as a guide for selecting the proper length for the appendage. For example, the appendage may have a mark identifying the relative positions of the mount and appendage for each of the chambers used with the appendage.

Handle 18 is used to place the fixture 10 inside of a chamber. Handle 18 is inserted within mount 24 and used to lift and move the fixture 10 into position in the chamber. So long as the weight of the fixture bears on the end of handle 18, there will be an angular load on the joint between handle 18 and mount 24, tending to misalign handle 18 and mount 24 and thereby creating friction preventing handle 18 from sliding out of mount 24. However, once the fixture 10 has been placed in position on the floor of the chamber, so that handle 18 no longer bears the weight of the fixture 10, handle 18 may be removed from mount 24 by aligning handle 18 with mount 24 and carefully sliding handle 18 from mount 24. To remove the fixture 10 from the chamber, handle 18 is aligned with mount 24 and carefully inserted into mount 24. Thereafter, the fixture 10 can be lifted with handle 18, creating misalignment and friction preventing handle 18 from sliding out of mount 24. This handle can be far less cumbersome to use than a conventional tongs manipulator, and therefore can reduce the time needed to place the fixture 10 inside a chamber. Furthermore, handle 18 can be made long enough to provide a safe distance between the operator and the chamber.

Figure 5:
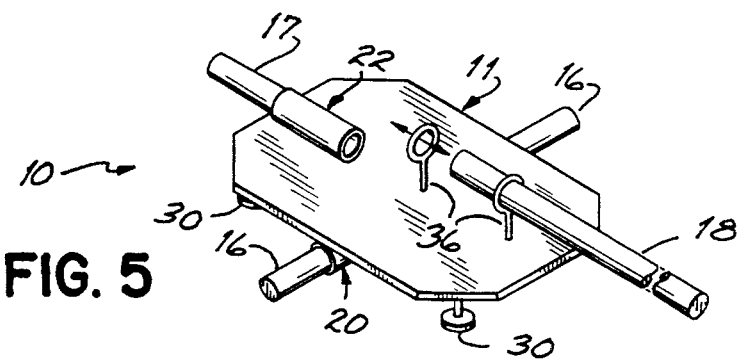
FIG. 5 is a perspective view of a fixture having an alternative handle mounting.

Referring to FIG. 5, in an alternative embodiment, handle 18 is mounted into two or more top-mounted eyelets 36 rather than a tube on the body 11 as shown in FIGS. 1–3. As in the previous embodiment, when the fixture is being lifted by the handle 18, angular load between eyelets 36 and handle 18 creates friction which prevents handle 18 from slipping from fixture 10. This embodiment may be preferable where fixture 10 sits low to the floor when placed in the treatment chamber, as the operator will not need to bend as far down to place and pick up the fixture.

In practice, it has been found that a fixture in accordance with principles of the invention can be placed in and removed from a thermal treatment chamber in approximately six seconds, which is far less time than is needed to manually place individual thermocouples. This reduced placement time allows the fixture to be placed in the chamber while the chamber is at temperature without excessive operator safety risk and without substantial temperature loss. It has been found that reliable temperature measurements are completed in approximately 15–20 minutes, as compared to 45–60 minutes required using prior manual methods.

Furthermore, a fixture in accordance with principles of the invention places the thermocouples far more accurately and consistently than has been achieved with manual methods, and therefore produces far more useful temperature measurement data.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A chamber temperature measuring fixture for measuring, at a plurality of desired locations, the temperature of a chamber used to thermally treat a production unit, the fixture comprising a body sized for placement within said chamber, a plurality of temperature probes mounted on said body in orientations such that, when said body is placed within said chamber, said probes measure the temperature of said chamber at said plurality of desired locations, and at least first and second guides affixed to said body and positioned to engage said chamber and thereby assist an operator to position said fixture within said chamber in at least first and second directions, whereby said temperature probes may be rapidly inserted into and removed from said chamber to measure the temperature of said chamber.

2. The test fixture of claim 1 wherein said chamber thermally treats said production unit by heating said production unit to a treatment temperature, and said temperature probes measure temperature over a range including said treatment temperature.

3. The test fixture of claim 1 wherein said chamber thermally treats said production unit by cooling said production unit to a treatment temperature, and said temperature probes measure temperature over a range including said treatment temperature.

4. The test fixture of claim 1 wherein said chamber is configured to thermally treat batches of production units, and said body is sized for insertion at the approximate location of a production unit of a batch.

5. The test fixture of claim 1 wherein said production unit is a semiconductor processing target, and said temperature probes have sufficient accuracy to detect temperature variations which would produce mechanical flaws in said target.

6. The test fixture of claim 1 wherein said first guide is adjustable, whereby said fixture may be used in chambers of different sizes.

7. The test fixture of claim 6 wherein said first guide comprises first and second rods sized to allow telescoping insertion one within another and a relative motion inhibitor selectively interconnecting said rods to inhibit said rods from relative movement in a selectably adjustable orientation.

8. The test fixture of claim 7 wherein one of said rods is affixed to said body, said relative motion inhibitor is an adjustment pin, said first rod has a first opening sized to accept said adjustment pin, said second rod has at least a second opening alignable with said first opening to permit insertion of said adjustment pin through said first and second openings to impede movement of said rods relative to each other.

9. The test fixture of claim 6 wherein said first guide comprises a first member with a threaded opening and a second member with a threaded end sized for threaded engagement into said opening, one of said first and second members being affixed to said body.

10. The test fixture of claim 1 wherein said first guide extends horizontally from said body and said second guide extends vertically from said body when said body is placed in said chamber.

11. The test fixture of claim 6 further comprising at least a third guide affixed to said body and positioned to engage said chamber and thereby assist an operator to position said fixture within said chamber in a third direction.

12. The test fixture of claim 1 further comprising a handle removably attached to said fixture.

13. The test fixture of claim 1 wherein said temperature probes are thermocouples.

14. In a chamber for treating a production unit by thermally treating said production unit, the improvement comprising a fixture for measuring the temperature of said chamber at a plurality of desired locations, the fixture comprising a body sized for placement within said chamber, a plurality of temperature probes mounted on said body in orientations such that, when said body is placed within said chamber, said probes measure the temperature of said chamber at said plurality of desired locations, and at least first and second guides affixed to said body and positioned to engage said chamber and thereby assist an operator to position said fixture within said chamber in at least first and second directions, whereby said temperature probes may be rapidly inserted into and removed from said chamber to measure the temperature of said chamber.

15. The fixture of claim 14 wherein said first guide extends horizontally from said body and said second guide extends vertically from said body when said body is placed in said chamber.

16. Apparatus for accurately thermally treating a production unit, comprising a thermal treatment chamber for containing said production unit during thermal treatment, a measuring fixture for measuring, at a plurality of desired locations, the temperature of said chamber, comprising
    a body sized for placement within said chamber, and a plurality of temperature probes mounted on said body in orientations such that, when said body is placed within said chamber, said probes measure the temperature of said chamber at said plurality of desired locations, and
    at least first and second guides affixed to said body and positioned to engage said chamber and thereby assist an operator to position said fixture within said chamber in at least first and second directions, said chamber alternately containing a production unit during a treatment and said fixture during a measurement of performance of said chamber.

17. The apparatus of claim 16 wherein said first guide extends horizontally from said body and said second guide extends vertically from said body when said body is placed in said chamber.

18. A method of measuring the temperature of a chamber used to thermally treat a production unit at a plurality of desired locations, comprising providing a body sized for placement within said chamber, and having mounted thereon a plurality of temperature probes in orientations such that, when said body is placed within said chamber, said probes measure the temperature of said chamber at said plurality of desired locations, and having at least first and second guides affixed thereto, inserting said body into said chamber while engaging said chamber with said first and second guides and thereby positioning said body within said chamber at a desired location in at least first and second directions, and measuring temperatures detected by said temperature probes at said plurality of desired locations.

19. The method of claim 18 wherein said production unit is a semiconductor processing target, and said temperature probes have sufficient accuracy to detect temperature variations which would produce mechanical flaws in said target.

20. The method of claim 18 wherein said guide is adjustable, and said method further comprises the step of adjusting said guide to a size appropriate for said chamber prior to inserting said body into said chamber.

21. The method of claim 18 wherein said first guide extends horizontally from said body and said second guide extends vertically from said body when said body is placed in said chamber.

22. The method of claim 18 wherein said body has mounted thereon at least a third guide, and said inserting step comprises engaging said chamber with said third guide and thereby positioning said body within said chamber at a desired location in at least a third direction.

23. The method of claim 18 wherein said body has a removable handle attached thereto, and said inserting step comprises using said handle to insert said body into said chamber, and removing said handle when said body is positioned in said chamber.

24. The method of claim 18 wherein said temperature probes are thermocouples, and said measuring step includes measuring temperatures with said thermocouples.

25. A chamber temperature measuring fixture for measuring, at a plurality of desired locations, the temperature of a chamber used to thermally treat a production unit, the fixture comprising a body sized for placement within said chamber, a plurality of temperature probes mounted on said body in orientations such that, when said body is placed within said chamber, said probes measure the temperature of said chamber at said plurality of desired locations, and an adjustable guide affixed to said body and positioned to engage said chamber and thereby assist an operator to position said fixture within said chamber in a first direction, said guide comprising first and second rods sized to allow telescoping insertion one within another and a relative motion inhibitor selectively interconnecting said rods to inhibit said rods from relative movement in a selectably adjustable orientation, whereby said temperature probes may be rapidly inserted into and removed from said chamber to measure the temperature of said chamber.

26. The fixture of claim 25 wherein one of said rods is affixed to said body, said relative motion inhibitor is an adjustment pin, said first rod has a first opening sized to accept said adjustment pin, said second rod has at least a second opening alignable with said first opening to permit insertion of said adjustment pin through said first and second openings to impede movement of said rods relative to each other.

27. A chamber temperature measuring fixture for measuring, at a plurality of desired locations, the temperature of a chamber used to thermally treat a production unit, the fixture comprising a body sized for placement within said chamber, a plurality of temperature probes mounted on said body in orientations such that, when said body is placed within said chamber, said probes measure the temperature of said chamber at said plurality of desired locations, and an adjustable guide affixed to said body and positioned to engage said chamber and thereby assist an operator to position said fixture within said chamber in a first direction, said guide comprising a first member with a threaded opening and a second member with a threaded end sized for threaded engagement into said opening, one of said first and second members being affixed to said body, whereby said temperature probes may be rapidly inserted into and removed from said chamber to measure the temperature of said chamber.

28. A method of measuring the temperature of a chamber used to thermally treat a production unit at a plurality of desired locations, comprising providing a body sized for placement within said chamber, and having mounted thereon at least one guide, a removable handle, and a plurality of temperature probes in orientations such that, when said body is placed within said chamber, said probes measure the temperature of said chamber at said plurality of desired locations, inserting said body into said chamber while engaging said chamber with said guide and thereby positioning said body within said chamber at a desired location in at least one direction, removing said handle when said body is positioned in said chamber, and measuring temperatures detected by said temperature probes at said plurality of desired locations.

29. A method of measuring the temperature of a chamber used to thermally treat a production unit at a plurality of desired locations, comprising providing a body sized for placement within said chamber, and having mounted thereon an adjustable guide comprising first and second rods sized to allow telescoping insertion one within another and a relative motion inhibitor selectively interconnecting said rods to inhibit said rods from relative movement in a selectably adjustable orientation, and a plurality of temperature probes in orientations such that, when said body is placed within said chamber, said probes measure the temperature of said chamber at said plurality of desired locations, adjusting said guide by releasing said relative motion inhibitor, moving said rods relative to each other, and re-engaging said relative motion inhibitor, and inserting said body into said chamber while engaging said chamber with said guide and thereby positioning said body within said chamber at a desired location in at least one direction, and measuring temperatures detected by said temperature probes at said plurality of desired locations.

30. A method of measuring the temperature of a chamber used to thermally treat a production unit at a plurality of desired locations, comprising providing a body sized for placement within said chamber, and having mounted thereon an adjustable guide comprising a first member with a threaded opening and a second member with a threaded end sized for threaded engagement into said opening, one of said first and second members being affixed to said body, and a plurality of temperature probes in orientations such that, when said body is placed within said chamber, said probes measure the temperature of said chamber at said plurality of desired locations, adjusting said guide by relative rotation of said first and second members to adapt said guide for use with said chamber, and inserting said body into said chamber while engaging said chamber with said guide and thereby positioning said body within said chamber at a desired location in at least one direction, and measuring temperatures detected by said temperature probes at said plurality of desired locations.

* * * * *